US008919135B2

(12) United States Patent
Barnes et al.

(10) Patent No.: US 8,919,135 B2
(45) Date of Patent: Dec. 30, 2014

(54) TURBOJET ENGINE WITH AN ELEMENT OF THE NACELLE ATTACHED TO THE INTERMEDIATE CASING

(75) Inventors: Emily Barnes, Paris (FR); Pierre-Alain Jean-Marie Philippe Hugues Chouard, Melun (FR); Yoann Marechal, Dammarie-les-Lys (FR)

(73) Assignee: SNECMA, Paris (FR)

( * ) Notice: Subject to any disclaimer, the term of this patent is extended or adjusted under 35 U.S.C. 154(b) by 780 days.

(21) Appl. No.: 13/179,916

(22) Filed: Jul. 11, 2011

(65) Prior Publication Data
US 2012/0011826 A1 Jan. 19, 2012

(30) Foreign Application Priority Data
Jul. 13, 2010 (FR) .................................... 10 55741

(51) Int. Cl.
*F02C 7/20* (2006.01)
*F02K 3/06* (2006.01)
(52) U.S. Cl.
CPC ... *F02C 7/20* (2013.01); *F02K 3/06* (2013.01); *Y02T 50/671* (2013.01); *F05D 2250/182* (2013.01); *F05D 2240/14* (2013.01); *F05D 2250/411* (2013.01); *F05D 2260/33* (2013.01); *F05D 2230/70* (2013.01)
USPC ........................................... 60/798; 60/226.2
(58) Field of Classification Search
USPC ................... 60/226.1, 226.2, 230, 232, 771, 60/796–798; 244/110 B; 239/265.19, 239/265.31
See application file for complete search history.

(56) References Cited

U.S. PATENT DOCUMENTS

| 2,877,623 | A | * | 3/1959 | Klompas | 60/800 |
| 3,227,418 | A | * | 1/1966 | West | 415/127 |
| 3,742,704 | A | * | 7/1973 | Adelizzi et al. | 60/796 |
| 4,037,809 | A | | 7/1977 | Legrand | |
| 4,552,386 | A | * | 11/1985 | Burchette | 285/187 |
| 4,951,973 | A | * | 8/1990 | Corsmeier | 285/24 |
| 5,338,154 | A | | 8/1994 | Meade et al. | |
| 5,737,913 | A | * | 4/1998 | Terry | 60/796 |
| 7,938,359 | B2 | * | 5/2011 | Guibert et al. | 60/226.1 |
| 2005/0046186 | A1 | | 3/2005 | Drescher | |
| 2010/0001123 | A1 | | 1/2010 | Hillereau et al. | |
| 2010/0146933 | A1 | | 6/2010 | Caruel | |
| 2010/0229526 | A1 | * | 9/2010 | Germain et al. | 60/226.1 |

FOREIGN PATENT DOCUMENTS

| EP | 0 118 051 | | 9/1984 |
| EP | 1239139 | A1 * | 9/2002 |
| FR | 2 291 091 | | 6/1976 |
| FR | 2 911 372 | | 7/2008 |
| FR | 2 916 426 | | 11/2008 |
| FR | 2920137 | * | 2/2009 |

OTHER PUBLICATIONS

French Preliminary Search Report issued Mar. 21, 2011, in French 1055741, filed Jul. 13, 2010 (with English Translation of Category of Cited Documents).

* cited by examiner

*Primary Examiner* — Ted Kim
(74) *Attorney, Agent, or Firm* — Oblon, Spivak, McClelland, Maier & Neustadt, L.L.P.

(57) ABSTRACT

A turbojet engine with a fan and a nacelle element forming the secondary duct downstream of the fan is provided. The turbojet engine includes an intermediate casing with an outer shroud to which the nacelle element is fixed by a connecting member. The connecting member includes a cylindrical element secured to the shroud while at the same time being capable of a rotational movement with respect to the axis of the engine and connected to the nacelle element by a bayonet-type fitting.

7 Claims, 3 Drawing Sheets

TURBOJET ENGINE WITH AN ELEMENT OF THE NACELLE ATTACHED TO THE INTERMEDIATE CASING

BACKGROUND OF THE INVENTION

The present invention relates to the field of turbojet engines, notably turbojet engines with a fan at the front, and is aimed more particularly at how a nacelle element that forms the fan case ducting downstream of the intermediate casing is fixed to the latter.

When an aircraft is propelled by turbojet engines, these may be fixed under the wing or to the fuselage. For example, when the engine is fixed under the wing, it is attached to a pylon through which the load passes. This pylon comprises engine fixing points for attaching to the engine at the front and at the rear. At the front, the fixing points are situated on that part of the engine that constitutes the component known as the intermediate casing.

Moreover, in order to slow the aircraft down once it has landed, the engines are equipped with thrust reversers which have the function of deflecting the propulsive flow in such a way as to produce a reverse, braking, thrust. In a subsonic bypass engine, the thrust reversers are generally arranged in such a way as to act on the bypass flow.

The nacelle of a subsonic bypass civilian engine generally comprises an air inlet, a main exhaust flow nozzle and a bypass flow duct ending in a bypass flow nozzle, as well as cowling elements covering the various parts of the engine. A known reverser device is positioned downstream of the intermediate casing of the engine in the region of that part of the nacelle that forms the bypass flow duct, also known as the fan case ducting, and the bypass flow nozzle. The device comprises an element capable of translational movement parallel to the axis of the engine and which uncovers openings positioned along the periphery of the nacelle and fitted with cascades. These cascades are made up of vanes which are parallel to one another so that they guide the airflow passing through them radially and in the upstream direction. The translational movement of the moving element is accompanied by a pivoting of flaps across the bypass flow path, immediately downstream of the cascades. The blocking of the flow path thus deflects the air flow toward the cascades.

This part of the nacelle that forms the bypass flow duct downstream of the intermediate casing may be made up of two C-shaped nacelle elements with one element on each side of the pylon. These nacelle elements can pivot individually about hinges mounted on the pylon and with axes parallel to the axis of the engine, so as to allow engine maintenance operators to access the engine. In order to ensure the rigidity of the whole and suitable transmission of load between engine, pylon and these nacelle elements, an appropriate connection between the nacelle elements and the intermediate casing of the engine is provided. This load is mainly an axial load (that is to say a load parallel to the axis of the engine) caused by the nozzle and a radial load caused by the expansion of the structure that forms the bypass flow path, under the pressure of the airflow.

DESCRIPTION OF THE PRIOR ART

One example of a connection between the intermediate casing and the nacelle elements comprises a groove formed on the periphery of the outer shroud of the intermediate casing of the engine and a blade on the periphery of the upstream interior edge of each of the reverser elements. A connection of this type is described in patent FR 2920137. This method of connection has the advantage of ensuring effective transfer of load in the longitudinal direction while at the same time allowing simple radial disconnection for easy opening of the nacelle elements so that the engine can be accessed.

It should be noted that the connection also has the function of providing airtightness between the pressurized bypass flow and the outside. This function is customarily performed using a seal in the bottom of the groove.

This method of connection becomes no longer appropriate when the downstream part of the nacelle is formed of a single annular element or of elements which are not designed to open about hinges of axes parallel to that of the engine. This is because these elements are then designed to slide along guideways parallel to the axis of the engine and their upstream edge can only slide axially and not pivot radially.

One exemplary embodiment of this type of sliding nacelle element is described in patent EP 1239139.

SUMMARY OF THE INVENTION

It is an object of the present invention to produce a means of connection between the engine and a downstream nacelle element which, when mounted to slide on the pylon, allows the nacelle element to be detached in such a way that it can slide in the downstream direction and provide access to the engine, notably for the purposes of engine maintenance.

For a turbojet engine with a fan and a nacelle element forming the secondary duct downstream of the fan, the turbojet engine comprising an intermediate casing with an outer shroud to which said nacelle element is fixed by means of a connecting member, this objective is achieved using a turbojet engine wherein the connecting member comprises a cylindrical element secured to the outer shroud while at the same time being capable of a rotational movement about the axis of the engine and connected to said nacelle element by a bayonet-type fitting.

Thanks to this cylindrical element rotating about the axis of the engine, the nacelle element can be engaged and disengaged selectively in a simple way while at the same time effectively locking the connection when the engine is in a flight phase.

According to one embodiment, the bayonet-type fitting comprises at least one segment with a transverse groove extending over an arc of a circle, formed on one or other of the cylindrical element and the nacelle element and collaborating with a radial flange portion in the form of a knife blade formed on one or other of the cylindrical element and the nacelle element. For preference, the bayonet-type fitting is formed of a plurality of grooved segments distributed about the periphery of one or other of the cylindrical element and the nacelle element and collaborating with a plurality of radial flange portions. The number of segments is a compromise between keeping their weight to a minimum and ease of engagement and disengagement of the parts during a maintenance procedure.

According to another feature, a bearing is inserted between the cylindrical element, more particularly the upstream part thereof, and the outer shroud of the fixed intermediate casing. This bearing allows the bayonet-type fitting to turn. It may be a plain bearing, a ball bearing or a roller bearing, depending on the optimum compromise reached between mass, robust engineering and ease of maintenance. The invention also provides a device allowing this rotary element to turn.

The invention also provides a device that affords the necessary airtightness upstream of the bayonet-type connection. This device may consist of a seal secured to the fixed or moving part of the connection and accommodating rotation.

The invention notably applies to a nacelle element which is capable of axial translational movement once it has been detached from the cylindrical element. The nacelle element advantageously comprises a first guideway element capable of collaborating with a second guideway element that complements the first and is secured to a pylon by means of which the turbojet engine is attached to an aircraft.

The invention preferably targets a turbojet engine of which the nacelle element that forms the bypass flow duct incorporates a thrust reverser device.

BRIEF DESCRIPTION OF THE DRAWINGS

Other features and advantages of the present invention will become apparent from the description which follows and from studying the attached figures in which.

DESCRIPTION OF THE PREFERRED EMBODIMENT

Figure 1:
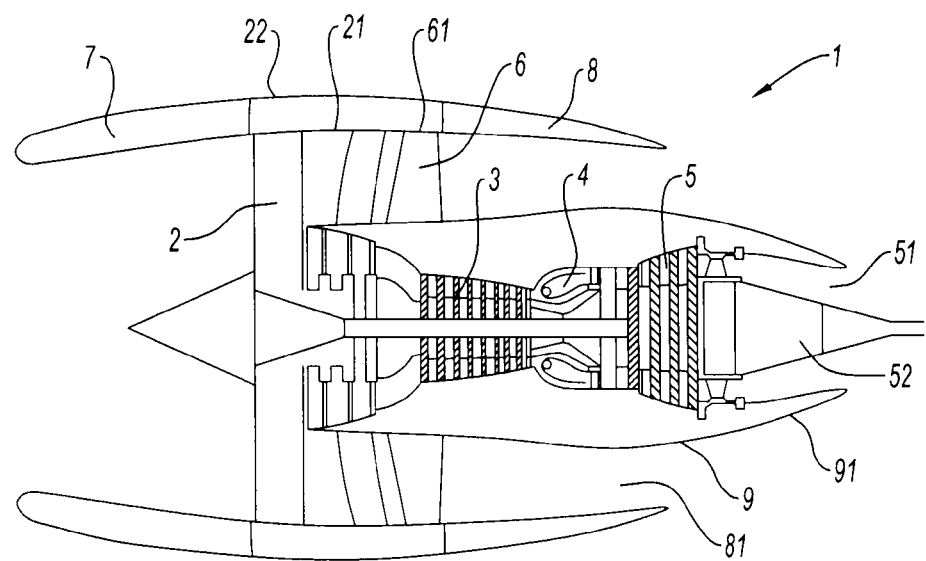
FIG. 1 is a schematic depiction in longitudinal section of a bypass turbojet engine with its nacelle.
Figure 5:
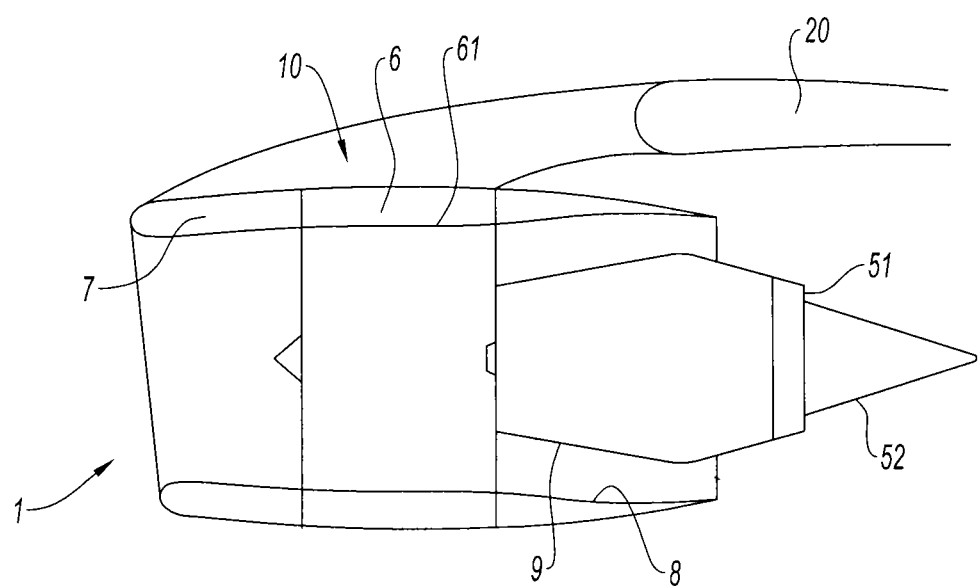
FIG. 5 is another schematic depiction in longitudinal section of a bypass turbojet engine with its nacelle.

The turbojet engine 1 of FIGS. 1 and 5 is shown with the nacelle elements that envelop it.

The engine comprises, from the upstream end downstream, the following various components: a fan 2 that takes in air, a compression section 3 comprising a low-pressure compressor followed by a high-pressure compressor, a combustion chamber 4, a turbine section 5 and a nozzle 51.

The engine also comprises a fan casing 21 and an intermediate casing 6. The intermediate casing 6 has a structural function inasmuch as it supports the upstream bearings of the engine in which the coaxial shafts that connect the compression stages to the turbine stages turn, the latter stages driving the former, and on which the upstream means of attachment to the pylon 10 for fixing to the wing 20 of the aircraft are provided.

It comprises an outer shroud 61 to which the fan casing 21 is attached at the upstream end and a nacelle element 8 is attached at the downstream end. The fan casing 21 defines the envelope of the air inlet duct in the continuity of the air inlet 7. The nacelle element 8 is fixed downstream to the intermediate casing shroud 61 and with a cowling 9 that envelops that part of the engine through which the main exhaust flow passes defines the bypass flow duct 81. This duct is annular, and has the attachment pylon which is not depicted in the figure passing longitudinally through its upper part.

The engine is thus enveloped in various elements constituting the nacelle and which have a function of fairing and of guiding the flow. Thus, the nacelle of the engine comprises, at the upstream end, the air inlet 7, a cowling 22 of the fan casing 21 and of the shroud 61 of the intermediate casing 6, the element 8 forming the bypass flow duct downstream of the intermediate casing. On the primary core the nacelle comprises the cowlings that envelop the engine and the downstream part 91 defining the annular main exhaust flow nozzle 51 with an exhaust bullet 52.

The engine operates as follows: the air, drawn in and compressed by the fan 2, is split into two concentric flows: a main flow and a bypass flow. The main flow is compressed successively by the various compression stages 3 and is then heated in the combustion chamber 4 so as to be expanded in the various turbine stages 5 before being discharged into the atmosphere by the main exhaust flow nozzle 51. The bypass flow is not heated; it is discharged through the bypass flow nozzle 81. In this instance the main and bypass flows are discharged separately but there are also configurations in which the two flows are mixed and discharged through a single nozzle.

The nacelle element 8 may be short or elongated. It comprises a thrust reverser device like the one described, for example, in patent EP 1 004 766 in the name of the present applicant. It is not depicted in the figures.

The invention is aimed at a method of connection between the nacelle element 8 and the shroud 61 of the intermediate casing.

As explained hereinabove, the nacelle element 8 is fixed, on the one hand, to the pylon, not depicted, by means of which the engine is attached to the aircraft and, on the other hand, to the intermediate casing. This element needs to be able to be disengaged from its upstream position of abutment so as to allow access to the engine particularly for maintenance operations.

When the nacelle element 8 is connected to the pylon by guideways which allow the sliding thereof in the downstream direction for disengagement, as explained in document FR 2 620 137, the groove and blade means of attachment to the intermediate casing is not feasible because that means requires a degree of freedom to rotate, which it does not have.

Figure 4:
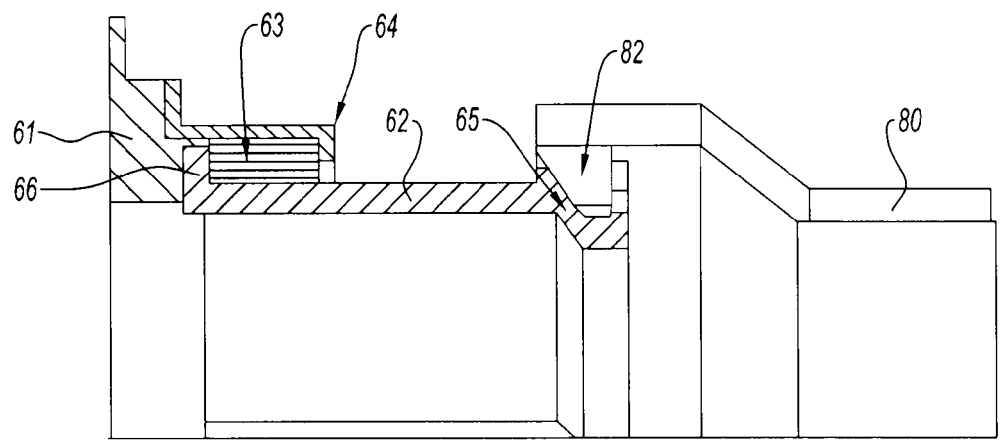
FIG. 4 is a partial view in longitudinal section through the connecting member.

The solution of the invention allows the nacelle element to be disengaged by sliding in the downstream direction. It is explained hereinafter with reference to FIGS. 2 to 4.

A connecting member connecting the shroud 61 of the intermediate casing and the nacelle element 8 comprises a cylindrical element 62 centered on the axis of the engine. It is connected at the upstream end to the outer shroud 61 of the intermediate casing in such a way as to be able to turn about this axis. For example, it is held by a bearing bushing or a plain bearing 63 which is itself held by a bearing cap 64, secured to the outer shroud 61. A radial flange 66 holds the cylindrical element axially with respect to the outer shroud of the intermediate casing.

On its downstream edge, the cylindrical element 62 comprises at least one segment with a transverse groove 65 extending over a portion of an arc of a circle. The groove has a V-shaped cross section with the downstream leg here perpendicular to the engine axis.

This segment engages with a radial flange portion 82 formed on the upstream edge of the inner liner 80 of the nacelle element 8. The cross section of the radial flange portion is of a shape that complements that of the groove of the grooved segment 65. The transverse groove 65 segment and the portion of radial flange 82 form a bayonet-type fitting. As may be seen in FIGS. 2 to 4, the bayonet-type fitting is formed of a plurality of pairs, each pair being made up of a segment with groove 65 and of a radial flange portion 82.

Figure 3A:
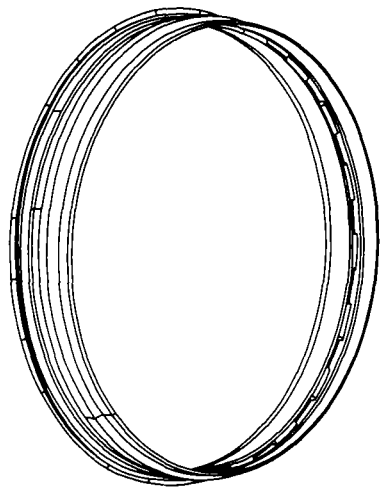
FIG. 3A is a schematic depiction, viewed in perspective, of the connecting member connecting the outer shroud of the intermediate casing and the upstream edge of the nacelle element situated downstream thereof, in the closed position.

This connecting member thus allows the nacelle element 8 to be locked, in a flight condition, in an upstream position when the radial flange portions are engaged in the grooves of the transversely grooved segments. Such an arrangement is depicted in FIG. 3A and, in greater detail, in FIG. 3B.

Figure 2A:
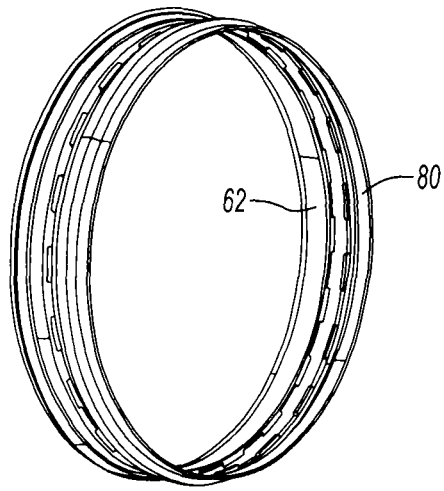
FIG. 2A is a schematic depiction, viewed in perspective, of the connecting member that connects the outer shroud of the intermediate casing and the upstream edge of the nacelle element situated downstream thereof, in the opened position.
Figure 2B:
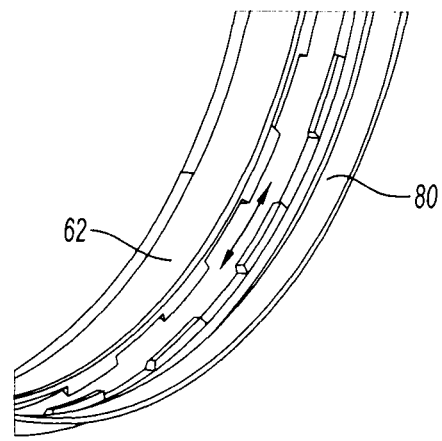
FIG. 2B shows the assembly of FIG. 2A in greater detail.
Figure 3B:
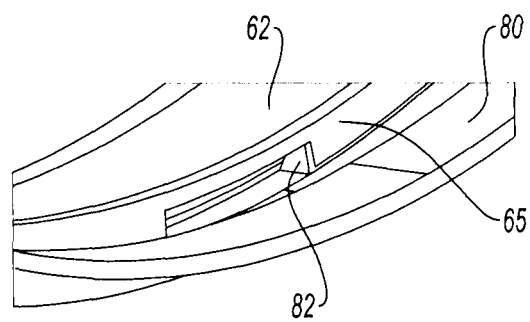
FIG. 3B shows the assembly of FIG. 3A in greater detail.

In order to disengage the nacelle element 8, all that is required is for the cylindrical element 62 to be turned through an angle that allows the flange portions 82 to position themselves between two grooved segments 65. The radial flange portions 82 are then no longer retained by the grooves of the grooved segments and can therefore be moved in the downstream direction. The nacelle element is no longer locked in the upstream position and can be moved in the downstream direction, as can be seen in FIG. 2A and, in greater detail, in FIG. 2B.

The downstream axial movement of the nacelle element 8 frees access to the engine.

The invention is not restricted to the embodiment depicted but encompasses all variations within the competence of those skilled in the art.

The invention claimed is:

1. A turbojet engine with a fan and a nacelle element forming a secondary duct downstream of the fan, the turbojet engine comprising:
    an intermediate casing with an outer shroud to which said nacelle element is fixed by a connecting member,
    wherein the connecting member comprises a cylindrical element secured to the outer shroud at an upstream end of the cylindrical element while being capable of a rotational movement with respect to an axis of the engine and connected to said nacelle element at a downstream end of the cylindrical element by a bayonet type fitting,
    wherein the bayonet type fitting includes a transverse groove extending over an arc of a circle and formed in one of the cylindrical element and the nacelle element, and a radial flange portion is formed in the other of the cylindrical element and the nacelle element,
    wherein, when the cylindrical element is in a first engaged position, the radial flange portion is engaged with the transverse groove so as to lock the connecting member with the nacelle in an axial direction, and, when the cylindrical element is in a second disengaged position, the radial flange portion is disengaged with the transverse groove such that the nacelle element is freely movable in the axial direction, and
    wherein the cylindrical element is movable between the first engaged position and the second disengaged position by the rotational movement with respect to the axis of the engine at a predetermined angle.

2. The turbojet engine as claimed in claim 1, further comprising a bearing inserted between the upstream end of the cylindrical element and the outer shroud of the intermediate casing.

3. The turbojet engine as claimed claim 1, wherein the nacelle element comprises a first guideway element capable of collaborating with the second guideway element that complements the first guideway element and is secured to the pylon which attaches the turbojet engine to an aircraft.

4. The turbojet engine as claimed in one of the preceding claims, the nacelle element incorporating a thrust reverser device.

5. The turbojet engine as claimed in claim 1, wherein the bayonet type fitting includes first and second transverse grooves, and when the cylindrical element is the second disengaged position, the radial flange portion is circumferentially disposed between the first and second transverse grooves.

6. The turbojet engine as claimed in claim 1, wherein the transverse groove present a V-shaped cross section and includes a downstream leg perpendicular to the axis of the engine.

7. The turbojet engine as claimed in claim 1, wherein the transverse groove is formed at the downstream end of the cylindrical element and the radial flange portion is formed on the nacelle element, the transverse groove opening toward a radially outer direction and the radial flange portion extending in a radially inner direction.

* * * * *

UNITED STATES PATENT AND TRADEMARK OFFICE
CERTIFICATE OF CORRECTION

| | | |
|---|---|---|
| PATENT NO. | : 8,919,135 B2 | Page 1 of 1 |
| APPLICATION NO. | : 13/179916 | |
| DATED | : December 30, 2014 | |
| INVENTOR(S) | : Emily Barnes et al. | |

It is certified that error appears in the above-identified patent and that said Letters Patent is hereby corrected as shown below:

In the Claims

Column 6, line 17, change "secured to the" to --secured to a--.

Signed and Sealed this
First Day of December, 2015

Michelle K. Lee
*Director of the United States Patent and Trademark Office*